United States Patent [19]

Oswald et al.

[11] 3,919,129
[45] Nov. 11, 1975

[54] CERTAIN PHOSPHORUS ACID ESTERS

[75] Inventors: Alexis A. Oswald, Mountainside; Paul L. Valint, Woodbridge, both of N.J.

[73] Assignee: Ciba-Geigy AG, Basel, Switzerland

[22] Filed: Oct. 9, 1973

[21] Appl. No.: 404,570

[30] Foreign Application Priority Data
Oct. 6, 1972 Switzerland.................. 14695/72

[52] U.S. Cl................................ 260/302 E; 424/200
[51] Int. Cl.².................................... C07D 285/12
[58] Field of Search ...................... 260/302 E

[56] References Cited
UNITED STATES PATENTS
2,706,194  4/1955  Morris et al..................... 260/302 E
3,239,532  3/1966  Rufgnacht....................... 260/302 E Primary Examiner—R. Gallagher
Attorney, Agent, or Firm—Frederick H. Rabin

[57] ABSTRACT

Organic phosphorus compounds of the formula

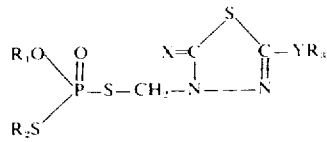

wherein
$R_1$ represents $C_1$-$C_2$-alkyl,
$R_2$ represents $C_3$-$C_4$-alkyl
$R_3$ represents $C_1$-$C_5$-alkyl, $C_1$-$C_4$-alkoxy-$C_1$-$C_4$-alkyl, $C_1$-$C_4$-alkylthio-$C_1$-$C_4$-alkyl or $C_3$-$C_4$-alkenyl, and
X and Y each represent oxygen or sulphur, processes for their preparation and their use in pest control.

12 Claims, No Drawings

CERTAIN PHOSPHORUS ACID ESTERS

The present invention relates to organic phosphorus compounds, to processes for their preparation, and to their use in pest control.

More particularly this invention relates to the unusual properties of certain unsymmetrical O,S-dialkyl 2,3-dihydrothiadiazolylmethyl dithiophosphate esters. A symmetrical dithiophosphate ester related to these esters, "Supracide", i.e. O,O-dimethyl S-2,3-dihydro-5-methoxy-2-oxo-1,3,4-thiadiazol-3-yl dithiophosphate is a known commercial insecticide described on page 326 in the third edition of The Pesticide Manual edited by H. Martin and issued by the British Crop Protection Council in 1972. The synthesis of known symmetrical esters of this type and their insecticidal action is described in the first volume of a monograph entitled "Chemie der Pflanzenschutz und Schadlingsbekampfungsmittel", edited by R. Wegler, published by Springer Verlap, New York, 1970, particularly on pages 340 and 341. The application of the related known compounds is limited to the field of insecticides and acaricides.

Surprisingly, the novel unsymmetrical compounds of the present invention have nematocidal and fungicidal action as well as insecticidal and acaricidal effectiveness. The unexpected overall properties of the novel compounds are particularly due to their thiol(II) rather than thionophosphate(I) structure and to their specific unsymmetrical(II) dialkyl substitution, e.g.

The phosphorus compounds correspond to the formula

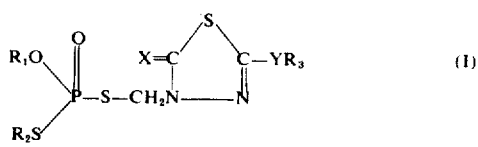

wherein
$R_1$ represents $C_1$-$C_2$-alkyl,
$R_2$ represents $C_3$-$C_5$ alkyl,
$R_3$ represents $C_1$-$C_5$-alkyl, $C_1$-$C_4$-alkoxy-$C_1$-$C_4$-alkyl, $C_1$-$C_4$-alkylthio-$C_1$-$C_4$-alkyl or $C_3$-$C_4$-alkenyl, $C_3$-$C_4$ alkynyl and
X and Y each represent oxygen or sulphur.

The alkyl, alkenyl, alkynyl, alkoxyalkyl and alkylthioalkyl groups denoted by $R_1$ to $R_3$ can be straight-chain or branched. Examples of such groups are: methyl, methoxy, methoxymethyl, methylthio, methylthiomethyl, ethyl, ethoxy, ethoxyethyl, ethylthio, ethylthioethyl, propyl, isopropyl, n-, i-, sec.-, tert.-butyl, n-pentyl, allyl, propargyl and their isomers.

Compounds of formula I which are preferred on account of their effectiveness are those wherein $R_1$ represents methyl or ethyl, preferably ethyl
$R_2$ represents n-propyl, isopropyl, n-butyl or isobutyl, particularly n-propyl or isobutyl,
$R_3$ represents $C_1$-$C_4$-alkyl, preferably methyl or ethyl,
X represents oxygen and sulfur, preferably oxygen,

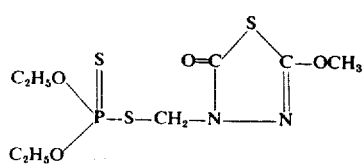

I known symmetrical thionophosphate

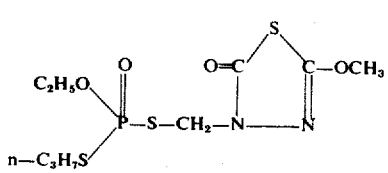

II novel unsymmetrical thiolphosphate

In the novel unsymmetrical O-ethyl or O-methyl thiolphosphate compounds a propylthio or butylthio substituent, particularly an n-propylthio or primary i-butylthio group leads to an unexpected optimization of useful biological properties, such as high activity and reduced toxicity. The same radicals lead to inferior activity in symmetrical or thionophosphate compounds.

Y represents oxygen or sulphur, preferably oxygen.
Particularly preferred compounds are of the general formula

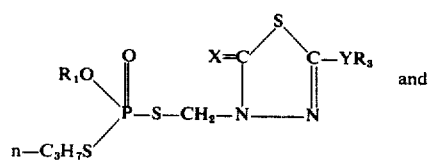 and 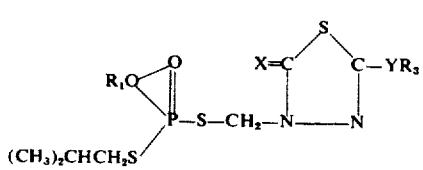

wherein the meaning of $R_1$, $R_3$, X and Y is the same.

The compounds of formula I are prepared by methods as follows:

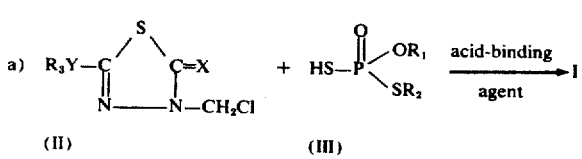

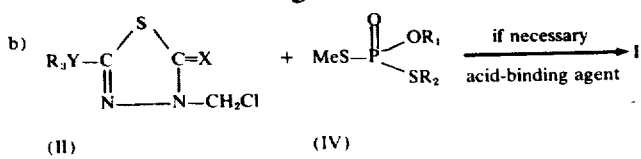

(II)   (IV)

In the formulae II, III and IV, the symbols $R_1$, $R_2$, $R_3$, X and Y have the meanings given for formula I, and Me stands for a monovalent metal, particularly an alkali metal.

Suitable acid-binding agents are: tertiary amines, e.g. trialkylamines, pyridine or dialkylanilines; inorganic bases such as hydroxides; carbonates and bicarbonates of alkali metals or alkaline-earth metals.

It is sometimes necessary that catalysts be used in the reactions, such as, e.g. copper or copper chloride.

The reactions a) and b) are performed at a temperature of 0°–120°C, preferably between 10 and 70°C, at normal pressure and in solvents or diluents that are inert to the reactants. The following, for example, are suitable as solvents or diluents: ethers and ethereal compounds, such as diethyl ether, dipropyl ether, dioxane, dimethoxyethane or tetrahydrofuran; amides such as N,N-di-alkylated carboxylic acid amides; aliphatic, aromatic as well as halogenated hydrocarbons, especially benzene, toluene, xylenes, chloroform or chlorobenzene; nitriles such as acetonitriles; DMSO; ketones such as acetone, methyl ethyl ketone, or mixtures of such solvents with water.

The starting materials of formulae II, III and IV are known, and can be prepared my methods analogous to known methods.

The compounds of formula I have a broad biocidal action and are therefore suitable for the control of diverse plant and animal pests. They possess however, in particular, insecticidal and acaricidal properties, and can be used against all development stages, such as e.g. eggs, larvae, pupae, nymphs and adults of insects and members of the order acarina, such as, e.g. against insects of the families: Tettigoniidae, Gryllidae, Gryllotalpidae, Blattidae, Reduviidae, Phyrrhocoridae, Cimicidae, Delphacidae, Aphididae, Diaspididae, Pseudococcidae, Scarabacidae, Dermestidae, Coccinellidae, Tenebrionidae, chrysomelidge, Bruchidae, Tineidae, Noctuidae, Lymatriidae, Pyralidae, Culcidae, Tripulidae, Stomoxydae, Trypetidae, Muscidae, Calliphoridae and Pulicidae, as well as acarids of the families: Ixodidae, Argasidae, Tetranychidae and Dermanyssidae.

The insecticidal or acaricidal action can be appreciably broadened and adapted to suit the given circumstances by the addition of other insecticides and/or acaricides. Suitable additives are, for example:

organic phosphorus compounds,
derivatives of nitrophenols,
formamidines,
ureas,
carbamates, and
chlorinated hydrocarbons.

The active substances of formula I are suitable also for the control of members of the division thallophyta, such as, e.g. viruses, bacteria and fungi. They thus have fungicidal properties rendering them effective against phytopathogenic fungi in various cultivated crops, such as corn, maize, rice, vegetables, ornamental plants, fruit trees, grape vines, field fruits, etc.. With the new active substances, fungi occurring on fruits, blossom, foliage, stalks, tubers and roots can be checked or destroyed, whereby parts of plants subsequently growing remain immune against such fungus infestation. The active substances of formula I are effective especially against phytopathogenic fungi belonging to the following classes: Oomycetes, Zygomycetes, Ascomycetes, Basidiomycetes and Denteromycetes.

Furthermore, the new active substances are used for the treatment of seed, fruits, tubers, etc. for protection against fungus infections due to, for example, smut fungus of all varieties, such as Ustilaginales, and for the control of phytopathogenic nematodes.

The compounds of formula I can be used on their own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays, or solutions, the formulation of these preparations being effected in a manner commonly known in practice. Also to be mentioned are cattle dips and spray races, in which aqueous preparations are used.

The agents according to the invention are produced in a manner known per se by the intimate mixing and/or grinding of active substances of formula I with the suitable carriers, optionally with the addition of dispersing agents or solvents which are inert to the active substances. The active substances can be obtained and used in the following preparation forms:

solid preparations:
  dusts, scattering agents, granulates, coated granulates, impregnated granulates and homogeneous granulates;

liquid preparations:
  a. water dispersible active substance concentrates: wettable powders, pastes, emulsions;
  b. solutions.

The content of active substance in the described agents is between 0.1 and 95%; it is to be mentioned in this connection that in the case of application from an aeroplane, or by means of other suitable devices, concentrations of up to 99.5% can be employed, or even the pure active substance.

The active substances of formula I can be prepared, for example, as follows:

Dusts:

The following substances are used in the preparation of (a) a 5% dust, and (b) a 2% dust:

a.
  5 parts of active substance,
  95 parts of talcum;

b.
  2 parts of active substance,
  1 part of highly dispersed silicic acid, 97 parts of talcum.

The active substances are mixed and ground with the carriers.

Granulate:

The following substances are used to produce a 5% granulate:

5 parts of active substance,
0.25 parts of epichlorhydrin,
0.25 parts of cetyl polyglycol ether,
3.50 parts of polyethylene glycol,
91 parts of kaolin (particle size 0.3 – 0.8 mm).

The active substance is mixed with epichlorhydrin and dissolved with 6 parts of acetone; the polyethylene glycol and cetyl polyglycol ether are then added. The solution thus obtained is sprayed on to kaolin, and the acetone subsequently evaporated off in vacuo.

Wettable powder:

The following constituents are used for the preparation of (a) a 40%, (b) and (c) a 25%, and (d) a 10% wettable powder:

a.
40 parts of active substance,
5 parts of sodium lignin sulphonate,
1 part of sodium dibutyl-naphthalene sulphonate,
54 parts of silicic acid.

b.
25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silicic acid,
19.5 parts of Champagne chalk,
28.1 parts of kaolin.

c.
25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminium silicate,
16.5 parts of kieselguhr,
46 parts of kaolin, d.
10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:

The following substances are used to produce (a) a 10% and (b) a 25% emulsifiable concentrate:

a.
10 parts of active substance,
3.4 parts of epoxidised vegetable oil,
13.4 parts of a combination emulsifier consisting of fatty alcohol polyglycol ether and alkylarylsulphonate calcium salt,
40 parts of dimethylformamide,
43.2 parts of xylene.

b.
25 parts of active substance,
2.5 parts of epoxidised vegetable oil,
10 parts of an alkylarylsulphonate/fatty alcohol polyglycol ether mixture
5 parts of dimethylformamide,
57.5 parts of xylene.

From these concentrates it is possible to produce, by dilution with water, emulsions of any desired concentration.

Spray:

The following constituents are used to prepare a 5% spray:

5 parts of active substance,
1 part of epichlorhydrin,
94 parts of ligroin (boiling limits 160°–190°C).

EXAMPLE 1

Preparation of O-ethyl-S-propyl-S-(5-methoxy-1,3,4-thiadiazol-2(3H)-on-3-yl-methyl)-dithiophosphate 76 g of potassium salt of O-ethyl-S-propyl-dithiophosphoric acid and 45 g of 3-chloromethyl-5-methoxy-1,3,4-thiadiazol-2(3H)-one are stirred in 250 ml of acetone for 6 hours at 58°C.

The acetone is then distilled off, and 100 ml of 10% sodium bicarbonate solution added to the residue; the precipitated oil is then isolated by extraction with ether, and subjected to molecular distillation to obtain the compound of the formula

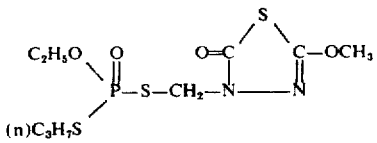

as pale yellow oil; B.P. 135°C/0.001 Torr.

Calculated: C 31.38 H 4.98 N 8.13 P 9.01 S 27.92%.
Found: 31.72 5.03 8.03 8.81 27.80. Further compounds prepared in an analogous manner are listed in the following table:

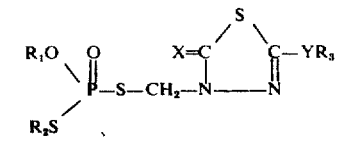

| $R_1$ | $R_2$ | $R_3$ | X | Y | Phys. data B.P./Torr °C |
|---|---|---|---|---|---|
| $CH_3$ | (n)-$C_3H_7$- | $CH_3$ | O | O | 140°/0,005 |
| $C_2H_5$ | (iso)-$C_3H_7$- | $CH_3$ | O | O | 140°/0,005 |
| $C_2H_5$ | (n)-$C_4H_9$- | $CH_3$ | O | O | 150°/0,005 |
| $C_2H_5$ | (iso)-$C_4H_9$- | $CH_3$ | O | O | 150°/0,005 |
| $CH_3$ | (n)-$C_3H_7$- | $C_2H_5$ | O | O | 145°/0,005 |
| $C_2H_5$ | (n)-$C_3H_7$- | $C_2H_5$ | O | O | 150°/0,005 |
| $C_2H_5$ | (iso)-$C_3H_7$- | $C_2H_5$ | O | O | 145°/0,005 |
| $C_2H_5$ | (n)-$C_4H_9$- | $C_2H_5$ | O | O | 150°/0,005 |
| $C_2H_5$ | (iso)-$C_4H_9$- | $C_2H_5$ | O | O | 150°/0,005 |
| $C_2H_5$ | (n)-$C_3H_7$- | (n)-$C_3H_7$ | O | O | 150°/0,01 |
| $C_2H_5$ | (n)-$C_3H_7$- | (n)-$C_4H_9$ | O | O | 160°/0,005 |
| $C_2H_5$ | (n)-$C_3H_7$- | (iso)-$C_3H_7$ | O | O | 150°/0,005 |
| $CH_3$ | (n)-$C_3H_7$- | $CH_3$ | O | S | 155°/0,005 |
| $C_2H_5$ | (n)-$C_3H_7$- | $CH_3$ | O | S | 155°/0,001 |
| $C_2H_5$ | (iso)-$C_3H_7$- | $CH_3$ | O | S | 145°/0,005 |
| $C_2H_5$ | (n)-$C_4H_9$- | $CH_3$ | O | S | 150°/0,001 |
| $C_2H_5$ | (iso)-$C_4H_9$- | $CH_3$ | O | S | 160°/0,005 |
| $C_2H_5$ | (iso)-$C_4H_9$- | (iso)-$C_3H_7$ | O | O | 150°/0,005 |
| $C_2H_5$ | (iso)-$C_3H_7$- | (iso)-$C_3H_7$ | O | O | 145°/0,005 |

-continued

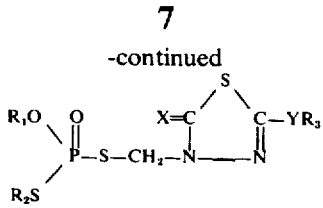

| $R_1$ | $R_2$ | $R_3$ | X | Y | Physical data B.P./Torr °C |
|---|---|---|---|---|---|
| $C_2H_5$ | $(n)C_4H_9$- | $(iso)$-$C_3H_7$ | O | O | 150°/0.005 |
| $C_2H_5$ | $(iso)C_4H_9$- | $(n)$-$C_3H_7$ | O | O | 150°/0.01 |

EXAMPLE 2

A. Insecticidal stomach poison action

Cotton and potato plants were sprayed with a 0.05% aqueous active-substance emulsion (obtained from a 10% emulsifiable concentrate).

After the drying of the obtained coating, *Spodoptera litoralis* or *Heliothis virescens* larvae $L_3$ were placed onto the cotton plants, and Colorada beetle larvae (Leptinotarsa decemlineata) onto the potato plants. The test was carried out at 24°C with 60% relative humidity.

The compounds according to Example 1 exhibited in the above test a good insecticidal stomach poison action against Spodoptera litoralis, Heliothis and Leptinotarsa decemlineata larvae.

B. Systemic insecticidal action

In order to determine the systemic action, rooted bean plants (*Vicia faba*) were placed into a 0.01% aqueous active-substance solution (obtained from a 10% emulsifiable concentrate). After a period of 24 hours, bean aphids (*Aphis fabae*) were placed onto the parts of the plants above the soil. The insects were protected by a special device from the effects of contact and of gas. The test was carried out at 24°C with 70% relative humidity.

In the above test, the compounds according to Example 1 exhibited a systemic action against *Aphis fabae*.

EXAMPLE 3

Action against Chilo suppressalis

Rice plants of the type Caloro were planted, 6 plants per pot, in plastic pots having a top diameter of 17 cm; and grown to a height of ca. 60 cm. Infestation with Chilo suppressalis larvae ($L_1$; 3–4 mm long) was carried out 2 days after application of the active substance in granular form (amount applied = 8 kg of active substance per hectare) to the paddy water. The evaluation of the insecticidal action was made 10 days after application of the granules.

The compounds according to Example 1 were effective against Chilo suppressalis in the above test.

EXAMPLE 4

Action against ticks

A. *Rhipicephalus bursa*

In each case, 5 adult ticks or 50 tick larvae were placed into a small glass test tube, and the test tubes then immersed for 1 to 2 minutes in 2 ml of an aqueous emulsion from a dilution series of 100, 10, 1 and 0.1 ppm of test substance. The tubes were then sealed with a standardised cotton plug, and inverted so that the active substance emulsion could be absorbed by the cotton wool.

An evaluation in the case of the adults was made after 2 weeks, and in the case of the larvae after 2 days. There were two repeats for each test.

B. *Boophilus microplus* (larvae)

With a dilution series analogous to that in Test A, tests were carried out with 20 sensitive larvae and OP-resistant larvae, respectively (resistance is with respect to diazinon compatibility).

Compounds according to Example 1 were effective in these tests against adults and larvae of Rhipicephalus bursa and against sensitive and OP-resistant larvae, respectively, of Boophilus microplus.

EXAMPLE 5

Acaricidal action

*Phaseolus vulgaris* (plants) were infested, 12 hours before the test for acaricidal action, with an infested piece of leaf from a mass culture of *Tetranychus urticae*. The transferred mobile stages were sprayed with the emulsified test preparations from a chromatography-sprayer in a manner ensuring no running off of the spray liquor. An assessment was made after 2 to 7 days, by examination under a binocular, of the living and of the dead larvae, adults and eggs, and the results expressed in percentages. The treated plants were kept during the "holding time" in greenhouse compartments at 25°C.

The compounds according to Example 1 were effective in the above test against adults, larvae and eggs of *Tetranychus urticae*.

EXAMPLE 6

Action against soil nematodes

In order to test the action against soil nematodes the active substances were added, in the concentration stated in each case, to soil infested with root-gall-nematodes (*Meloidogyne arenaria*), and the whole intimately mixed. In the one test series, tomato seedlings were planted immediately afterwards in the thus prepared soil, and in the other test series tomatoes were planted after a waiting time of 8 days.

For an assessment of the nematicidal action, the galls present on the roots were counted 28 days after planting and sowing, respectively.

Active substances according to Example 1 exhibited in this test a good action against *Meloidogyne arenaria*.

What we claim is:

1. Compound of the formula

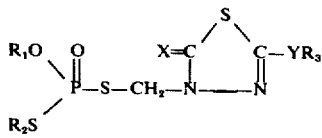

wherein
$R_1$ represents $C_1$-$C_2$-alkyl,
$R_2$ represents $C_3$-$C_4$-alkyl
$R_3$ represents $C_1$-$C_5$-alkyl, $C_1$-$C_4$-alkoxy-$C_1$-$C_4$-alkyl, $C_1$-$C_4$-alkylthio-$C_1$-$C_4$-alkyl or $C_3$-$C_4$-alkenyl, and
X and Y each represent oxygen or sulphur.

2. A compound according to claim 1, wherein
$R_1$ represents methyl or ethyl,

R₂ represents n-propyl or isobutyl,
R₃ represents C₁-C₄-alkyl, and
X represents oxygen.

3. A compound according to claim 1 wherein R₂ is n-propyl.

4. A compound according to claim 1 wherein R₂ is i-butyl.

5. Compound according to claim 2 of the formula

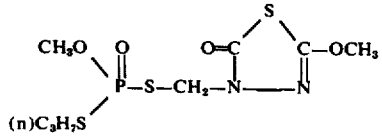

6. Compound according to claim 2 of the formula

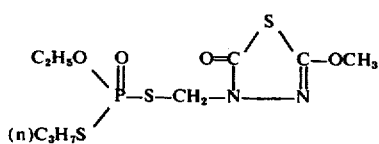

7. Compound according to claim 2 of the formula

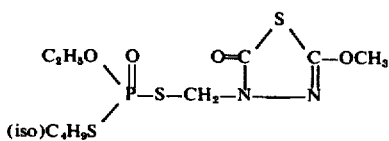

8. Compound according to claim 2 of the formula

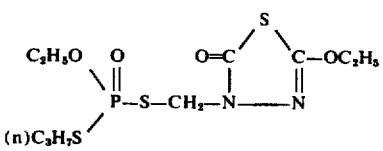

9. Compound according to claim 2 of the formula

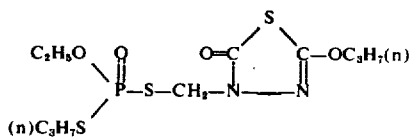

10. Compound according to claim 2 of the formula

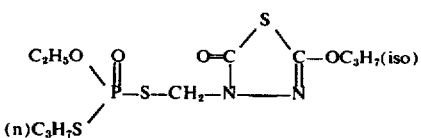

11. Compound according to claim 2 of the formula

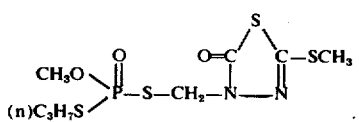

12. Compound according to claim 2 of the formula

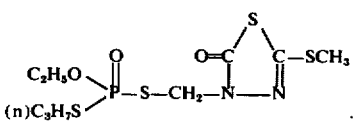

* * * * *